US007197635B2

(12) United States Patent
Keohane et al.

(10) Patent No.: US 7,197,635 B2
(45) Date of Patent: Mar. 27, 2007

(54) METHOD AND APPARATUS FOR PROVIDING UPDATED TIME AT A DATA PROCESSING SYSTEM

(75) Inventors: Susann Marie Keohane, Austin, TX (US); Gerald Francis McBrearty, Austin, TX (US); Shawn Patrick Mullen, Buda, TX (US); Jessica Kelley Murillo, Hutto, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 407 days.

(21) Appl. No.: 10/655,402

(22) Filed: Sep. 4, 2003

(65) Prior Publication Data

US 2005/0054341 A1 Mar. 10, 2005

(51) Int. Cl.
*G06F 1/24* (2006.01)

(52) U.S. Cl. .............................. 713/100; 713/1; 713/2

(58) Field of Classification Search .................... 713/1, 713/201, 100, 2; 709/206, 203; 368/21; 379/142.1, 207.03, 221.14
See application file for complete search history.

(56) References Cited

U.S. PATENT DOCUMENTS

| | | | | |
|---|---|---|---|---|
| 5,631,949 | A * | 5/1997 | Milton et al. | 379/88.2 |
| 5,835,061 | A * | 11/1998 | Stewart | 342/457 |
| 6,108,789 | A * | 8/2000 | Dancs et al. | 726/9 |
| 6,192,007 | B1 * | 2/2001 | Aoshima | 368/10 |
| 6,343,360 | B1 | 1/2002 | Feinleib | 713/1 |
| 6,370,566 | B2 * | 4/2002 | Discolo et al. | 709/206 |
| 6,738,465 | B1 * | 5/2004 | Hu | 379/210.01 |
| 6,831,970 | B1 * | 12/2004 | Awada et al. | 379/201.01 |
| 6,938,213 | B2 * | 8/2005 | Brown et al. | 715/758 |
| 2002/0138302 | A1 * | 9/2002 | Bodnick | 705/2 |
| 2003/0059019 | A1 * | 3/2003 | Chakera | 379/211.02 |

OTHER PUBLICATIONS http://www.faqs.org/rfcs/rfc2881.html, RFC 2881 (rfc2881)—Network Access Server Requirements Next Generation, Jul. 30, 2003, pp. 1-15.

* cited by examiner

*Primary Examiner*—Thomas Lee
*Assistant Examiner*—Malcolm Cribbs
(74) *Attorney, Agent, or Firm*—Duke W. Yee; Marilyn Smith Dawkins; Rakesh Garg

(57) ABSTRACT

A method, apparatus, and computer instructions for providing updated time at a mobile data processing system. An area code is determined from a call made to a server from the mobile data processing system. A time zone is determined using the area code to form an identified time zone; and an adjusted time based on the identified time zone is sent to the mobile data processing system.

14 Claims, 3 Drawing Sheets

METHOD AND APPARATUS FOR PROVIDING UPDATED TIME AT A DATA PROCESSING SYSTEM

BACKGROUND OF THE INVENTION

1. Technical Field

The present invention relates generally to an improved data processing system, and in particular to a method and apparatus for managing notifications. Still more particularly, the present invention provides a method, apparatus, and computer instructions for adjusting notifications of meetings based on a time zone in which a data processing system is located.

2. Description of Related Art

The Internet, also referred to as an "internetwork", is a set of computer networks, possibly dissimilar, joined together by means of gateways that handle data transfer and the conversion of messages from a protocol of the sending network to a protocol used by the receiving network. When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL).

Additionally, the Internet also provides a medium for exchanging messages. Specifically, electronic or email messages may be exchanged between different users on the Internet. An email server is used to send and receive messages between different users. Further, other services, such as calendar or meeting schedules may be provided through the servers. For example, a user may schedule a meeting for 2:00 p.m. This meeting is stored on the server and a notice may be sent to the user prior to the meeting.

Additionally, a user may set up meetings between the user and other persons. If the meeting is set for 2:00 p.m. a notice may be sent to other users to confirm whether they will be able to attend the meeting. These types of notices are adjusted for time zone changes based on the location of the users. For example, if the user setting the meeting for 2:00 p.m. is in the central standard time zone and one of the other users is in the eastern standard time zone, the notice to that other user is adjusted for the time zone and would provide a time of 3:00 p.m. for the meeting.

Although the meeting features are useful, incorrect notices may occur when a user with a laptop travels. One problem is that the time on the laptop may become incorrect. Such a situation occurs if the user travels from one time zone to another time zone and forgets or chooses not to reset the time on the laptop. Mail services, such as Lotus Notes, which is available from Lotus Development Corporation, adjust meeting schedules based on the local time for the sender and the time set on the receiver of the notice.

For example, if the user travels to the eastern standard time zone from the central standard time zone and sends out a meeting notice for 2:00 p.m. without updating the time on the laptop, the receiver of the notice will be notified that the meeting is for 3:00 p.m., rather than 2:00 p.m. As a result, the receiver of the notice will show up or call at the incorrect time if the meeting is confirmed because the server incorrectly adjusts the meeting time.

Therefore, it would be advantageous to have an improved method, apparatus, and computer instructions for adjusting a system clock on a data processing system without requiring user intervention.

SUMMARY OF THE INVENTION

The present invention provides a method, apparatus, and computer instructions for providing updated time at a mobile data processing system. An area code is determined from a call made to a server from the mobile data processing system. A time zone is determined using the area code to form an identified time zone; and an adjusted time based on the identified time zone is sent to the mobile data processing system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
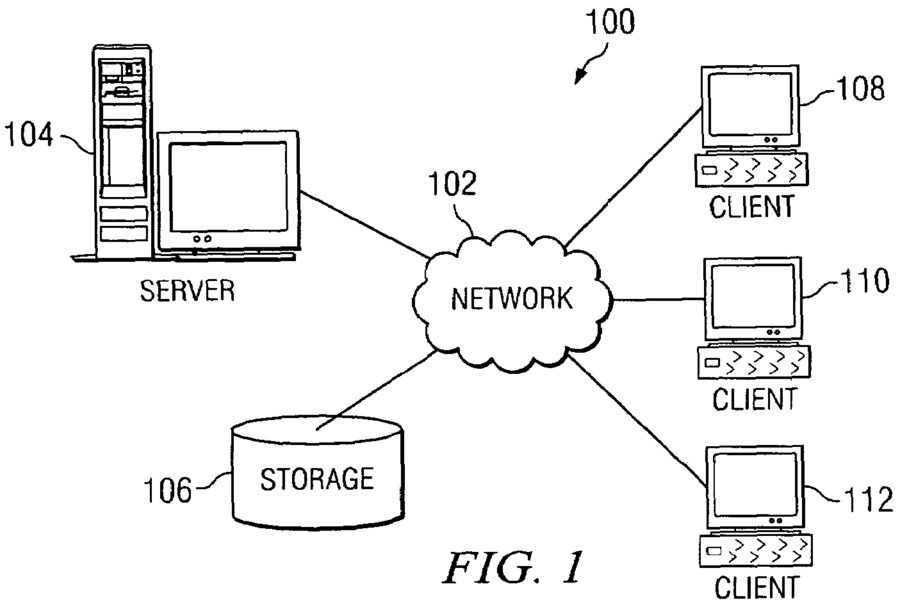
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108–112. Specifically, server 104 may function as an email server and provide various email services, including sending meeting notices. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
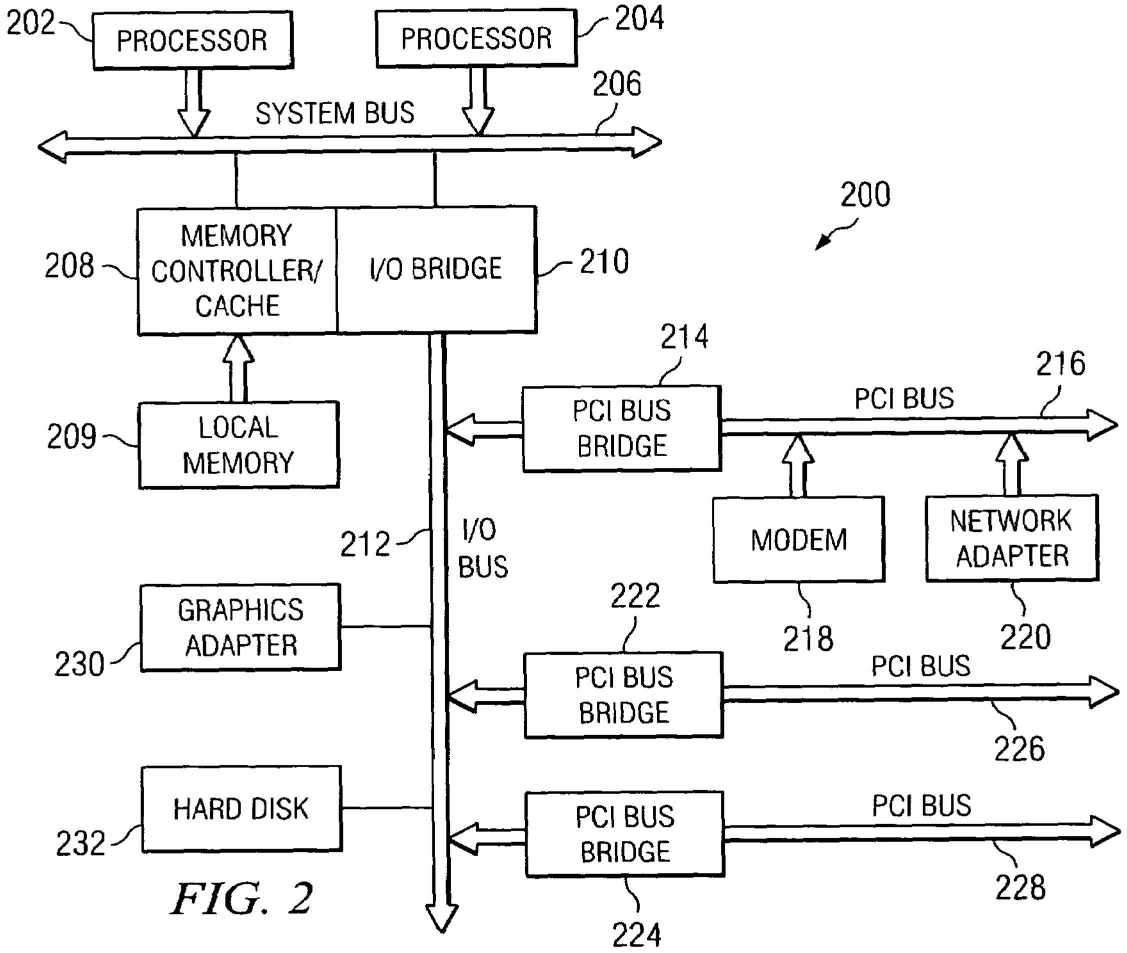
FIG. 2 is a block diagram of a data processing system that may be implemented as a server.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
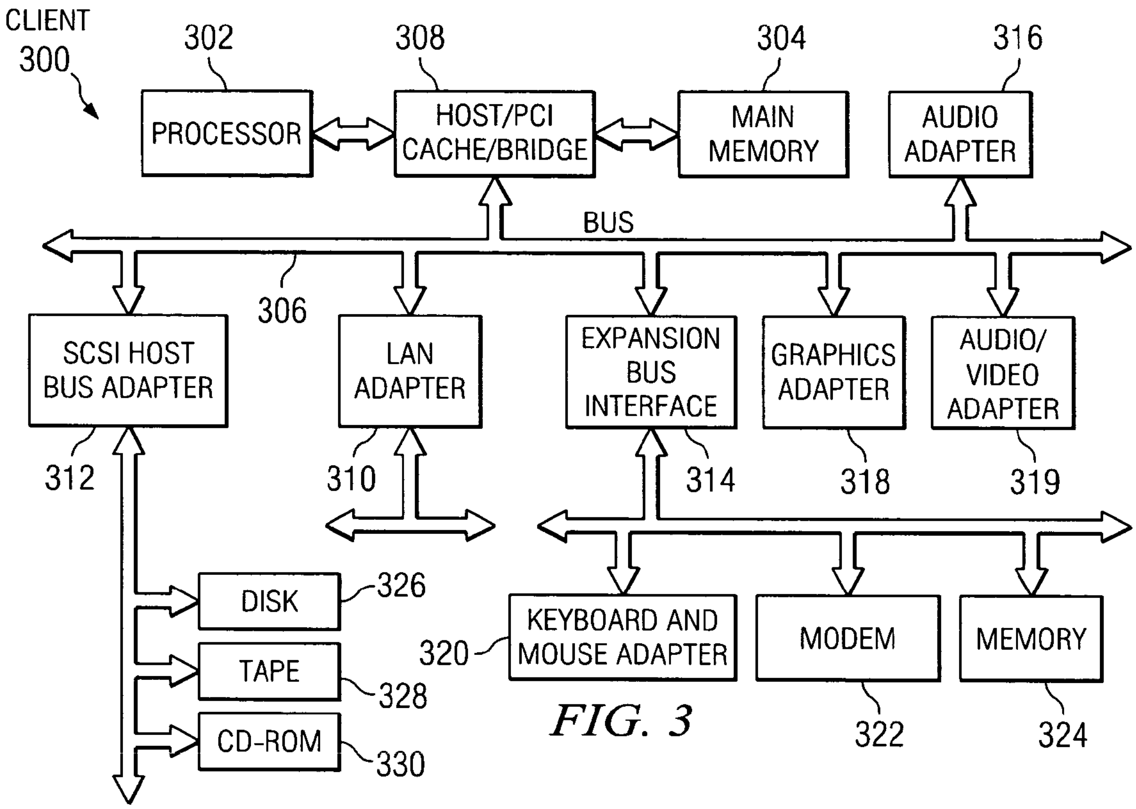
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3.

Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus, and computer instructions for updating time on a mobile data processing system. The mechanism of the present invention identifies an area code from which a call is made by a mobile data processing system, such as a laptop computer. A time zone is identified from the area code from this time zone. An adjusted time may be sent to the mobile data processing system to set the system clock. In addition, meeting notices may be adjusted to take in account changes in the time zone caused by the user traveling to a different location.

Figure 4:
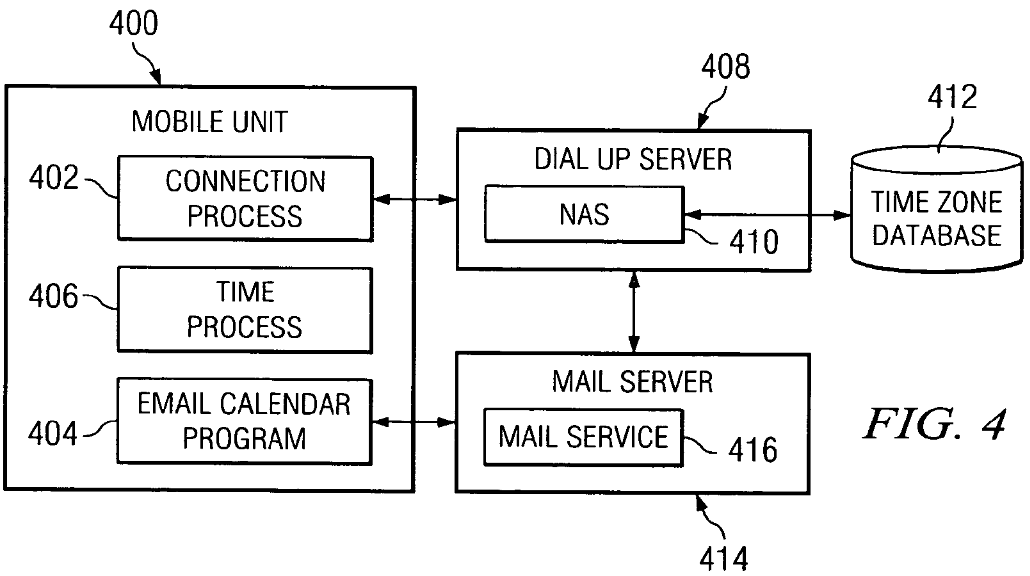
FIG. 4 is a diagram of events used in adjusting time for a data processing system in accordance with a preferred embodiment of the present invention.

Turning next to FIG. 4, a diagram of events used in adjusting time for a data processing system is depicted in accordance with a preferred embodiment of the present invention. In this example, mobile unit 400 is a mobile data processing unit, such as, for example, a laptop computer. Mobile unit 400 includes connection process 402, and email and calendar program 404, and time process 406.

A user may establish a connection to access the Internet and email services through dial-up server 408. In these examples, dial-up server 408 may be implemented using a server, such as data processing system 200 in FIG. 2. More specifically, this server may take the form of a Radius server, which is available from Nortel Networks Limited. A Radius server is used by service providers to manage authentication, authorization, and accounting of access to the Internet. Specifically, dial-up server 408 is configured for use with dial-up users. A dial-up user is a user who connects to dial-up server 408 through a modem which dials an access number.

In these examples, when connection process 402 initiates a call through a modem to dial-up server 408, network access server (NAS) 410 manages this call. Network access server 410 is compliant with RFC 2881, which identifies network access server requirements. Network access server 410 obtains the calling number from which mobile unit 400 initiates a request for access. This process is defined in RFC 2881, which is incorporated herein by reference. RFC 2881 describes a model of a network access server. Alternatively, the calling information also may be obtained through caller id data. This source of calling information, however, may be absent or blocked in some cases.

The mechanism of the present invention uses the calling information to identify a time zone for mobile unit 400. The identification of the time zone may be made through a database of time zones correlated to area codes, such as time zone database 412.

When the time zone is identified, network access server 410 may return in adjusted or current time to mobile unit 400. This time may be used to adjust the time in mobile unit 400. In these examples, time process 406 includes instructions for updating time within mobile unit 400 in response to receiving an updated time from dial-up server 408. More specifically, time process 406 may be used to adjust the time for a system clock in mobile unit 400. As a result, the time at mobile unit 400 may be automatically updated or adjusted as part of the connection process to dial-up server 408.

Many mail services base the calculation of time based on the time set in mobile unit 400. In some cases, the time set in mobile unit 400 may not be used. For example, the time zone may have been preset by the user on mail server 414. In this case, dial-up server 408 may send the correct time zone information to mail server 414. With this correct time zone information, notification of meetings and other notices sent by mail service 416 to email and calendar service 404 may be adjusted to have the correct time.

In the example in which the time at mobile unit 400 is not updated and mail service 416 normally bases the time for notifications on the time set in mobile unit 400, the correct time zone information received from dial-up server 408 is used by mail service 416 to adjust the time for date or time sensitive notices. As can be seen from these different examples, the identified time zone for mobile unit 400 may be used to provide the appropriate time to mobile unit 400 or to provide for generation of notices with appropriate time adjustment purposes.

Figure 5:
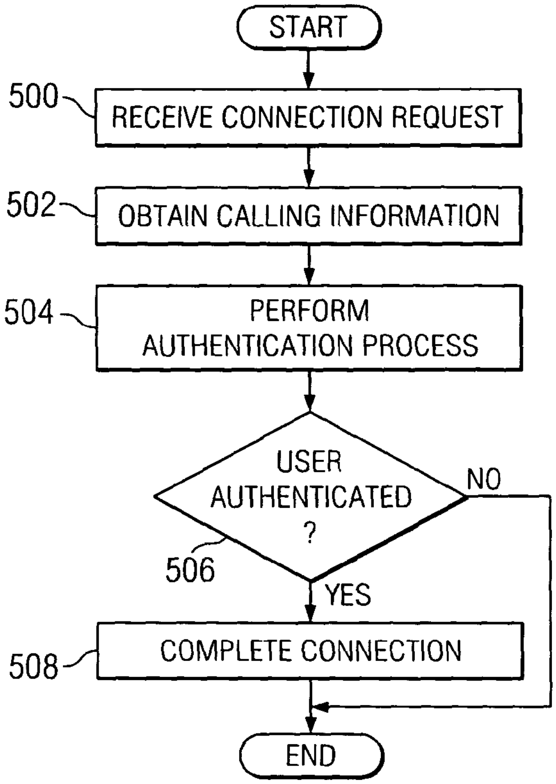
FIG. 5 is a flowchart of a process for handling a connection request in accordance with a preferred embodiment of the present invention.

Turning next to FIG. 5, a flowchart of a process for handling a connection request is depicted in accordance with a preferred embodiment of the present invention. The process illustrated in FIG. 5 may be implemented in a server such as network access server 410 in FIG. 4.

The process begins by receiving a connection request (step 500). In these examples, the connection request is received from a client data processing system such as mobile unit 400, which initiates a call through a modem. Calling information is then obtained from the client (step 502). In these examples, the calling information includes the area code and phone number used by the requester to call the network access server.

An authentication process is performed for the user (step 504). In these examples, the authentication confirms that the user is a valid user of the service. Next, a determination is made as to whether the user has been authenticated (step 506). If the user has been authenticated, the connection is completed and the user is allowed access to the service (step 508) with the process terminating thereafter.

Turning back to step 506, if the user is not authenticated the process terminates. In this manner, the area code of the number from which the call is initiated is obtained for use in updating time for a client, such as mobile unit 400.

Figure 6:
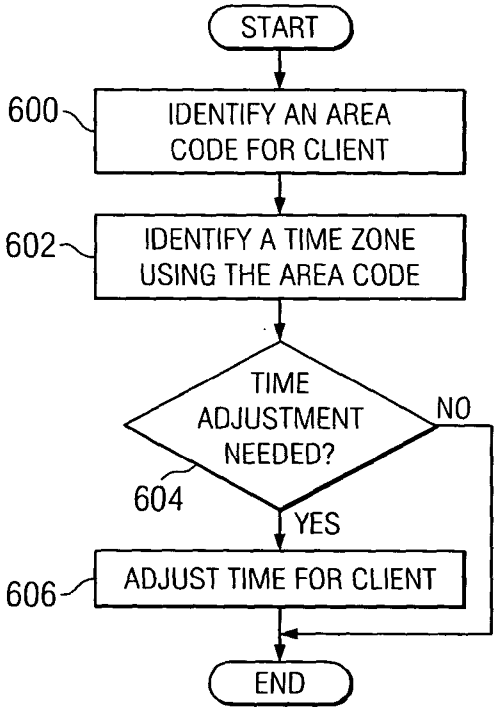
FIG. 6 is a flowchart of a process for identifying a time zone for a client in accordance with a preferred embodiment of the present invention.

Turning to FIG. 6, a flowchart of a process for identifying a time zone for a client is depicted in accordance with a preferred embodiment of the present invention. The process illustrated in FIG. 6 may be implemented in a server, such as network access server 410 in FIG. 4.

The process begins by identifying an area code for the client (step 600). In these examples, the area code is identified from the calling information obtained in step 502 in FIG. 5. A time zone is then identified using the area code (step 602). The time zone may be identified by correlating the area code to a database of time zones and area codes in which an area code is used as a key or index to identify a time zone. A determination is then made as to whether a time adjustment is needed (step 604). A time adjustment is needed if the time on the client is incorrect. This adjustment may be made in different ways depending on the type of data processing system. For example, on UNIX systems the command /usr/bin/date, gives the current time of the system.

If a time adjustment is needed, the time is adjusted for the client (step 606) with the process terminating thereafter. This adjustment may be made by sending the identified time zone to a time process on a client, such as time process 406 in FIG. 4. In this manner, mail services, which base times on the time set at a client may generate notifications with the correct time and date.

Figure 7:
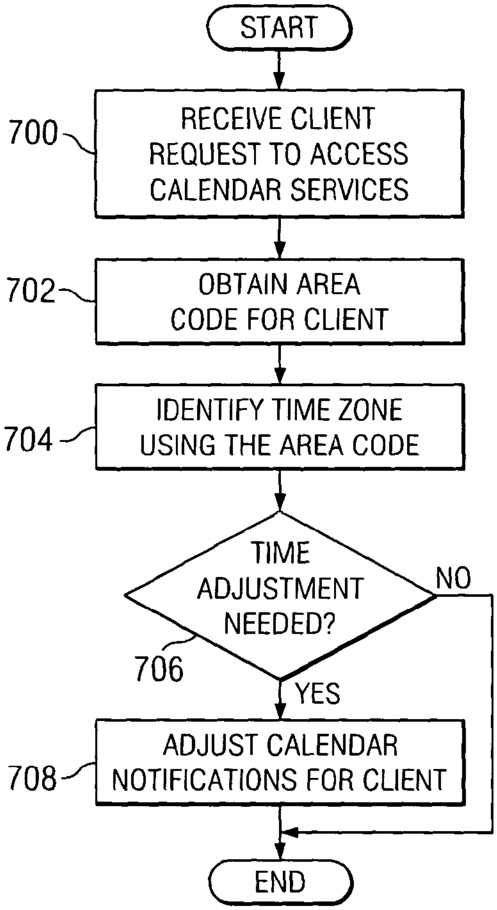
FIG. 7 is a flowchart of a process for adjusting notifications for a user in accordance with a preferred embodiment of the present invention.

With reference now to FIG. 7, a flowchart of a process for adjusting notifications for a user is depicted in accordance with a preferred embodiment of the present invention. The process illustrated in FIG. 7 may be implemented in a mail or calendar server, such as mail service 416 in FIG. 4.

The process begins by receiving a client request to access calendar services (step 700). This request may be, for example, a user at the client generating a meeting request to set up a meeting with other users. An area code is obtained for the client (step 702). This area code information may be obtained from an access provider, such as from dialup server 408 in FIG. 4. This dial-up server may be identified from user settings identifying the service provider.

In response to obtaining the area code, the current time zone for the client is identified (step 704). A determination is then made as to whether a time adjustment is needed (step 706). This determination may be made by comparing the current time zone identified for the client with the time zone set at the client. If a time zone adjustment is needed, calendar notifications are adjusted for the user (step 708) with the process termination thereafter.

With reference again to step 706, if a time adjustment is not needed, the process terminates. In this manner, a mail server may adjust the time for notifications for a client even if the client has not been updated with the correct time.

Thus, the present invention provides an improved method, apparatus, and improved instructions for adjusting time for a system clock to reflect a correct time zone in which a data processing system is located. This time zone information is identified through calling information obtained from the data processing system when a call is initiated to establish a connection. Through this mechanism, the time in a data processing system may be automatically updated and notifications containing the correct time and date may be generated.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method providing updated time at a mobile data processing system, the method comprising:

providing updated time at a mobile data processing system by determining an area code from which a call is made to a server from the mobile data processing system;

determining a time zone using the area code to form an identified time zone;

sending an adjusted time, based on the identified time zone, to the mobile data processing system;

informing at least one of a mail server and a calendar server of the adjusted time; and adjusting meeting notices displayed at the mobile data processing system to have a correct time in accordance with the adjusted time.

2. The method of claim 1, wherein the call is made by a modem in the mobile data processing system.

3. The method of claim 1, wherein the mobile data processing system is selected from one of a laptop computer, a personal digital assistant, a table personal computer, and a mobile phone.

4. The method of claim 1, wherein the server is one of an email server, a calendar server, a dialup connection server, or a time server.

5. A method in a mobile data processing system for adjusting time, the method comprising:

sending an area code from the mobile data processing system to a server, wherein the server is at least one of an email server, a calendar server, dialup connection server, and a time server; and receiving meeting notices at the mobile data processing system that are adjusted for a time zone associated with the area code.

6. The method of claim 5 further comprising:

receiving an adjusted time based on the time zone associated with the area code from the server; and setting a time on the mobile data processing system using the adjusted time received from the server.

7. A data processing system providing updated time at a mobile data processing system, the data processing system comprising:

initiating means for initiating a dial-up connection process using the mobile data processing system;

determining means for providing updated time at a mobile data processing system by determining an area code from which a call is made to a server from the mobile data processing system;

determining means for determining a time zone using the area code to form an identified time zone;

sending means for sending an adjusted time, based on the identified time zone, to the mobile data processing system;

informing means for informing at least one of a mail server and a calendar server of the adjusted time; and adjusting means for adjusting meeting notices displayed at the mobile data processing system to have a correct time in accordance with the adjusted time.

8. The data processing system of claim 7, wherein the call is made by a modem in the mobile data processing system.

9. The data processing system of claim 7, wherein the mobile data processing system is selected from one of a laptop computer, a personal digital assistant, a table personal computer, and a mobile phone.

10. The data processing system of claim 7, wherein the server is one of an email server, a calendar server, a dialup connection server, or a time server.

11. A data processing system in a mobile data processing system for adjusting time, the data processing system comprising:

sending means for sending an area code from the mobile data processing system to a server, wherein the server is at least one of an email server, a calendar server, dialup connection server, and a time server; and receiving means for receiving meeting notices at the mobile data processing system that are adjusted for a time zone associated with the area code.

12. The data processing system of claim 11 further comprising:

receiving means for receiving an adjusted time based on the time zone associated with the area code form the server; and setting means for setting a time on the mobile data processing system using the adjusted time received from the server.

13. A computer program product in a computer readable medium providing updated time at a mobile data processing system, the computer program product comprising:

first instructions for providing updated time at a mobile data processing system by determining an area code from which a call is made to a server from the mobile data processing system;

second instructions for determining a time zone using the area code to form an identified time zone;

third instructions for sending an adjusted time, based on the identified time zone, to the mobile data processing system;

fourth instructions for informing at least one of a mail server and a calendar server of the adjusted time; and fifth instructions for adjusting meeting notices displayed at the mobile data processing system to have a correct time in accordance with the adjusted time.

14. A method providing updated time at a mobile data processing system, the method comprising:

initiating a dial-up connection process on the mobile data processing system;

determining an area code from which a call is made to a server from the mobile data processing system;

determining a time zone using the area code to form an identified time zone;

sending an adjusted time, based on the identified time zone, to the mobile data processing system for providing updated time at the mobile data processing system as a part of the connection process;

informing at least one of a mail server and a calendar server of the adjusted time; and adjusting meeting notices displayed at the mobile data processing system to have a correct time in accordance with the adjusted time.

* * * * *